United States Patent
Motsenbocker

(10) Patent No.: US 10,367,352 B2
(45) Date of Patent: Jul. 30, 2019

(54) USE OF INTERRUPTED DIRECT CURRENT POWER BY APPLIANCES

(71) Applicant: Marvin Motsenbocker, Kamijima (JP)

(72) Inventor: Marvin Motsenbocker, Kamijima (JP)

(*) Notice: Subject to any disclaimer, the term of this patent is extended or adjusted under 35 U.S.C. 154(b) by 141 days.

(21) Appl. No.: 15/657,161

(22) Filed: Jul. 23, 2017

(65) Prior Publication Data

US 2018/0034268 A1 Feb. 1, 2018

Related U.S. Application Data

(60) Provisional application No. 62/457,997, filed on Feb. 12, 2017, provisional application No. 62/502,576, filed on May 5, 2017, provisional application No. 62/367,114, filed on Jul. 27, 2016.

(51) Int. Cl.

| H02J 1/06 | (2006.01) |
|---|---|
| H02J 5/00 | (2016.01) |
| H02J 1/08 | (2006.01) |
| H02J 1/10 | (2006.01) |
| H02M 3/156 | (2006.01) |

(52) U.S. Cl.
CPC .................... *H02J 1/06* (2013.01); *H02J 1/08* (2013.01); *H02J 1/10* (2013.01); *H02J 5/00* (2013.01); *H02M 3/156* (2013.01)

(58) Field of Classification Search
CPC ........ H02J 1/06; H02J 1/08; H02J 1/10; H02J 5/00; G06F 1/26; H02M 3/156
USPC .......................................................... 307/73
See application file for complete search history.

(56) References Cited

U.S. PATENT DOCUMENTS

| 9,172,245 B1* | 10/2015 | Lentine ..................... H02J 3/00 |
| 2013/0278078 A1* | 10/2013 | Ohlsson ................ H01H 9/548 |
| | | 307/113 |
| 2013/0327077 A1* | 12/2013 | Motsenbocker .......... H02J 1/00 |
| | | 62/324.1 |
| 2016/0365817 A1* | 12/2016 | Schuster ................. H02P 23/26 |

* cited by examiner

*Primary Examiner* — Tomi Skibinski

(57) ABSTRACT

Direct current ("DC") power such as from solar panels is used by home appliances directly without conversion to AC. The large direct current spark problem is alleviated by interrupting the DC current at periodicities of at least 120 hertz and typically 99 percent duty cycle. This interrupted DC power is less harmful to switches and circuit breakers than equivalent AC power. Furthermore, the interrupted DC power is used with greater efficiency by computers, and can be used to power a wide range of appliances. Exceptions are inductive appliances, which are detected and treated differently, by a smart power receptacle embodiment. These embodiments provide a very low cost and efficient path to an all DC electric power future.

20 Claims, 10 Drawing Sheets

USE OF INTERRUPTED DIRECT CURRENT POWER BY APPLIANCES

CROSS-REFERENCE TO RELATED APPLICATIONS

This application receives priority from U.S. No. 62/457,997 filed Feb. 12, 2017 with Marvin Motsenbocker as inventor, from U.S. No. 62/502,576 filed May 5, 2017 with Marvin Motsenbocker as inventor, and from U.S. 62/367,114 filed Jul. 27, 2016 with Marvin Motsenbocker as inventor. These disclosures in their entireties are incorporated by reference.

FIELD OF THE INVENTION

This disclosure relates to electric power distribution devices such as switches, circuit breakers, electrical outlets, inverters and to direct current power used in these devices.

BACKGROUND

Nicola Tesla's alternating current ("AC") electricity powers appliances and machinery connected to the electric grid because 100 years ago, Tesla proved that his transformers could easily change AC voltage. Electrical equipment, however, increasingly is designed for (or already was compatible with) DC power but is forced to accommodate AC power. For example, computers, cell phones, printers, televisions, modern heat pumps and air conditioners use direct current and have to convert AC to DC power before they can use the electricity. Furthermore, the most inexpensive form of electricity going forward is direct current from solar electricity. Thus, AC and DC must be interconverted twice, with attendant losses and the need for equipment costs to do so.

Having to convert DC to AC and then back to DC again increasingly limits efficiency, in part also because of voltage and phase changes needed. Increasingly, modern appliances such as computer and cell phone power adapters, induction stoves and heat pumps need DC and unnecessarily have to deal with AC power issues such as power factor correction.

Inefficiency also arises from induction loads having big turn-on surge currents such as vacuum pumps used in refrigerators. The instantaneous turn on current of such load may be many times higher than the running load. This causes high equipment costs because the inductor used by a DC to AC inverter to change voltage will saturate at high current pulses and limits power throughput based on that starting pulse. This forces the use of an expensive and inefficient large inverter for a small appliance that may need 160 watts to run, but an 800 watt inverter in order to start. A distribution system for DC power that avoids one or more inductor based voltage conversions would provide tremendous cost and efficiency advantages. Accordingly, any technology that can allow more direct use of DC power from the premier future power source (solar electric) by the end user will lower running costs, infrastructure costs and control costs.

An underappreciated problem of using DC power for appliances is that the on-off switches for these appliances are designed for utility supplied 60 hertz alternating current. DC current is more damaging to switches because when a switch opens up to disconnect, a long spark is formed. AC power goes to zero volts at 120 times per second, which allows a spark to break apart more easily, than a spark formed by continuous direct current. A variety of techniques have been explored to alleviate the spark problem. See for example WO2015021010A1 "Commutating switch with blocking semiconductor" by Faulkner et al. and U.S. Pat. No. 9,450,394 by Ohlsson et al.

The limitation of switch contacts for DC power has grown with the boom in solar electric DC power, which requires switches and circuit breakers that can handle high DC current loads. DC compatible switches and circuit breakers for the same voltage and current capacities as AC circuit breakers in particular cost at least several times more. New technology is needed to lower these costs as well.

SUMMARY OF THE INVENTION

Embodiments of the invention alleviate the problem of incompatibility of DC power with switches designed for AC power control, by interrupting the DC by a minimum periodic rate. An embodiment provides an electric power distribution circuit that supplies direct current power to electric appliances, comprising: source of direct current power, a connection for an electric appliance, and an interrupter electrically interposed between the source of direct current power and the connection to the electric appliance, wherein the interrupter interrupts the direct current power periodically by at least 250 hertz per second with an off time interrupt interval of no more than 3% of the period.

Embodiments provide improved circuit breakers and other switches. An embodiment provides a circuit breaker for blocking direct current from flowing from a source to a connected circuit upon detection of a current overload; comprising: a mechanical circuit breaker that interrupts a circuit upon detection of an excess current flow; and a direct current to pulsing direct current circuit interposed between current from a supply of direct current to the mechanical circuit breaker; wherein, the interrupter circuit provides a constant supply of interrupted direct current from the source to the mechanical circuit breaker and wherein the interrupter circuit interrupts the direct current at a minimum periodic rate of 250 hertz with an off time less than 3% of the period. In an embodiment the circuit breaker interrupt periodicity is at least 1000 hertz and the off time is no more than 10 microseconds. In an embodiment, the connection to the electric appliance is permanent. In an embodiment, the interrupter interrupts the direct current power periodically by at least 500 hertz per second and with an interrupt interval of no more than 5 microseconds. An embodiment further comprises a smart switch that deactivates the supply of direct current power to the electric appliance upon detecting a back pulse during the interrupt interval. An embodiment has direct current power of at least 100 volts, and the electric appliance has a mechanical on-off switch that is insufficient to handle the direct current power in the absence of interruption by the interrupter due spark formation from uninterrupted direct current power. In an embodiment the interrupter interrupts the direct current power periodically by at least 1000 hertz per second. In an embodiment the interrupter interrupts the direct current power periodically by at least 10000 hertz per second. An embodiment further comprises an alternating circuit that converts the supply of direct current into alternating current for supply to the electric appliance in response to detecting a back pulse during the interrupt interval.

An embodiment provides a circuit breaker for blocking direct current from flowing from a source to a connected circuit upon detection of a current overload; comprising a mechanical circuit breaker that interrupts a circuit upon detection of an excess current flow; and a direct current to pulsing direct current circuit interposed between current from a supply of direct current to the mechanical circuit breaker; wherein, the interrupter circuit provides a constant supply of interrupted direct current from the source to the mechanical circuit breaker and wherein the interrupter circuit interrupts the direct current at a minimum periodic rate of 250 hertz with an off time less than 3% of the period. In an embodiment the periodicity is at least 1000 hertz and the off time is no more than 10 microseconds. An embodiment further comprises a unitized container wherein the container has a volume that contains the mechanical circuit breaker and the pulsing direct current circuit. An embodiment further comprises a capacitor of at least 1 nanofarad rated for at least 1000 volts, connected in parallel to the interrupted direct current at a connected circuit side of the mechanical circuit breaker.

An embodiment provides an improvement to a circuit breaker, comprising a circuit breaker having a power source input and a load output; and an interrupt circuit interposed between the circuit breaker power source input and a power source and that continuously interrupts a direct current from the power source at a periodicity of at least 250 Hz and an off time of less than 3% of the period. In an embodiment the periodicity is at least 1000 Hz and the off time is no more than 1%.

An embodiment is an electrical power supply box comprising a power receptacle outlet that can accept a plug of the electric appliance and that further comprises the interrupter.

An embodiment is a resilience energy apparatus for supplementing utility power while providing back up power, comprising an input connection for utility power; an input connection for at least one DC power selected from local DC grid power and solar electric power; a connection to a storage battery for charging and discharging the battery; a high voltage pulsed DC or AC power output receptacle for plugging in appliances; and a low voltage DC power output connection; and further comprising a switch for a first position to alternately connecting to utility power for simultaneous use of utility power with DC power, or to a second position for DC power only; wherein the battery is automatically charged by utility power and DC power at the first position of the switch or DC power only at the second position of the switch; and the battery supplies low voltage DC power and supplies power to the high voltage DC or AC power output when insufficient power comes from the two input connections. In an embodiment, the apparatus comprises a DC to DC inverter that converts low voltage DC power to high voltage DC power to supply the high voltage DC or AC power output receptacle and a high voltage to low voltage battery charger circuit for charging the battery from the two input connections.

An embodiment is a resilience energy apparatus for supplementing utility power while providing back up power, comprising an input connection for at least local grid or utility power; a high voltage pulsed power output receptacle for plugging in appliances; and a circuit for providing pulsed AC power of varying duty cycle determined by at least one of input voltage and output voltage. An embodiment further comprises a smart switch that senses inductance of a plugged in appliance and responds by at least one of: disconnecting the appliance or preventing full power to the appliance; and switching to square wave AC or modified AC or smooth sine wave AC power to the appliance, in response to a detected inductance signal above a threshold. In an embodiment the circuit decreases duty cycle of pulsed power output in response to a sensed input connection voltage below a threshold. In an embodiment the circuit decreases duty cycle of pulsed power output in response to a sensed output voltage or current below a threshold.

An embodiment is a DC to AC conversion circuit that converts DC to square wave AC and absorbs at least part of harmonics of the produced square wave and recycles harmonic power for enhanced efficiency. In an embodiment the circuit generates a composite signal of harmonics with the fundamental frequency missing or suppressed by at least 90% and uses the composite signal to selectively remove harmonic power. In an embodiment the circuit comprises a transformer that receives harmonic power and isolates that power from the input, for recycling back to the input.

An embodiment is a power conversion apparatus that accepts a DC power or AC power input and converts the power into a square wave of varying duty cycle, wherein the duty cycle is controlled in response to at least one of input voltage and output voltage to achieve regulation of at least input voltage and output voltage.

DETAILED DESCRIPTION

DC electricity in an interrupted form was used to power a wide variety of appliances in the home. Surprisingly, most of the appliances could be used without problem via a discovered set of electrical parameters. Interrupted DC power was used having the same root-mean-square ("RMS") voltage as the AC voltage used for a specific appliance. For a 120 volt appliance that runs on AC, 120 volt DC was used. The main obstacle to DC power for most appliances was increased sparking of switches used to operate the appliances.

It was discovered that periodically interrupting the DC power at a high enough rate suppressed the sparking. In fact, conditions were discovered, (generally more than 250 Hz, especially more than 500 Hz, more especially more than 1000 Hz) wherein the pulsed DC was superior to AC on switch contact wear, as characterized by integrated spark size during a switching event. See FIG. 1, which shows how an increase in interrupt frequency greatly decreased spark size. Also surprisingly, the duration of off time for the pulsing DC was less important (see FIG. 1) and could be minimized to less than 1%, and preferably less than 0.5% of the total time, often measured as just a few microseconds, a microsecond, or less.

Interrupted DC

Figure 7:
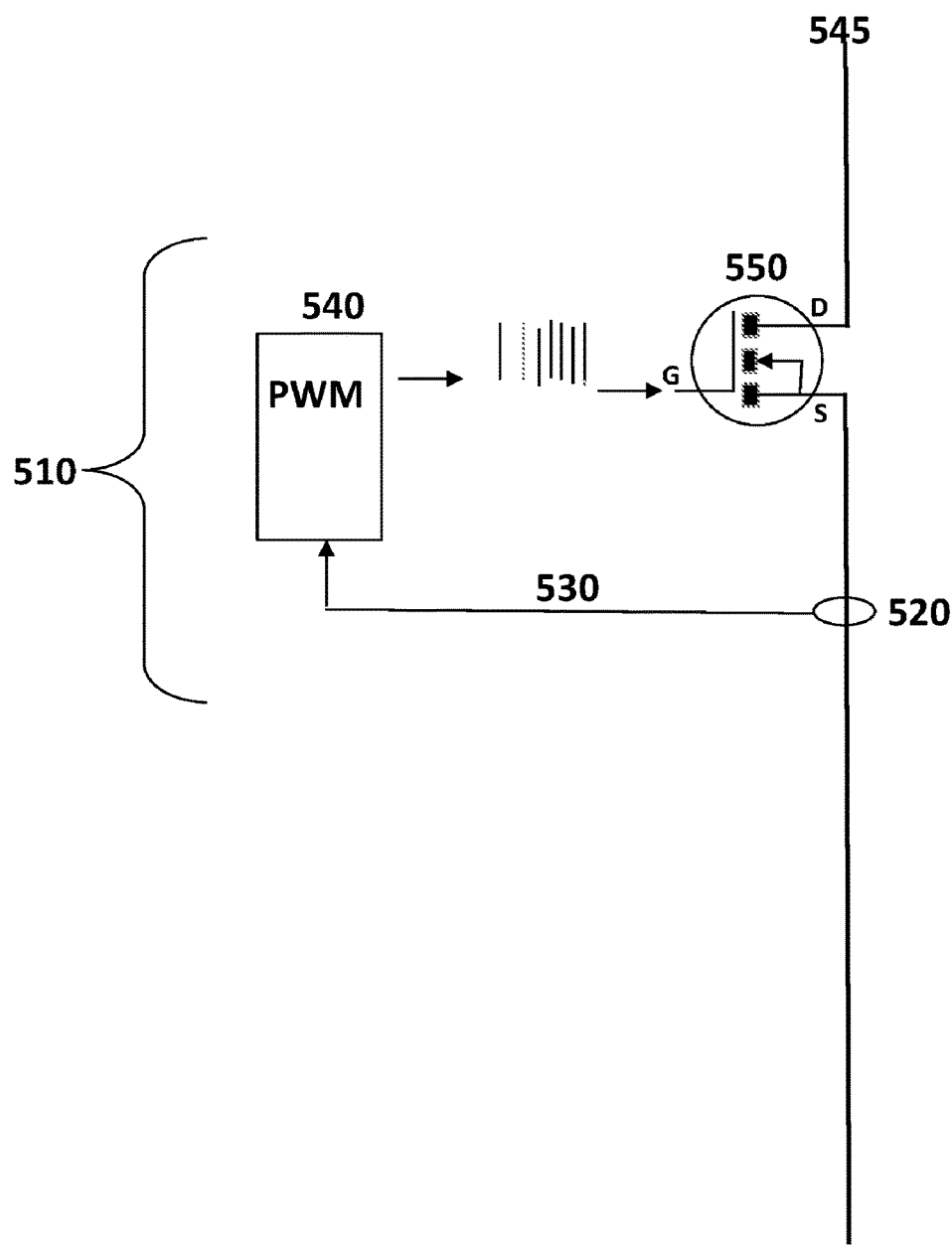
FIG. 7 shows a preferred circuit outline for providing DC power.

"Interrupted DC" means direct electrical current that is periodically interrupted for short time periods, typically by less than 3% time, preferably by less than 1% time and more preferably by less than 0.5% time. "Time" in this context means the elapsed time between power interruption events. In a preferred embodiment, a solid state switch such as a MOSFET or IGBT interrupts the DC power by rapidly turning off and then on again after an off-time period. See, for example FIG. 7, which shows a circuit 510 wherein PWM 540 interrupts power line 520 connected to output 545 via MOSFET 550. FIG. 7 shows PWM 540 providing vertical pulses to MOSFET 550. Preferably a measured waveform shows the off-time period as a sharp drop with virtually instantly off and on times. In an embodiment, however, the off time may be achieved by a more gradual or less sharp voltage transition. For example, a 5 microsecond off time created by an abruptly switching transistor can be replaced by a 5 microsecond long straight or curved slope. In an embodiment this decreases harmonic radiation and is preferred. Preferably the direct current has a constant voltage and has fast on/off transitions of at least 100 volts per microsecond.

All experiments and examples given here relied on a constant periodic interruption cycle (frequency rate of interrupts) for convenience of control circuit design. However, a skilled artisan can appreciate that the time between interruptions and the interruption time itself do not necessarily have to be consistent from cycle to cycle. Non-consistent timings will work as long as the interruption (off time of current) period is long enough to facilitate spark collapse across a switch's contacts, particularly during the break phase of switches.

In an embodiment, a first off-time period that occurs during a switch opening condition preferably is followed by a longer pulse or even a complete shut off. For example a circuit can monitor impedance across the switch or otherwise determine that an off-time or on-time event has occurred during switch opening by comparing a sensed condition with a threshold. That determination can then activate a shut off of the electronic pulsing circuit. In this case, the sensing circuit should electronically monitor each pulse. The monitoring can be for example of each off-time impedance or voltage drop across the switch or other parameter, or each on-time impedance or other parameter, or a combination of two parameters.

Interrupter

An interrupter is a circuit that temporarily blocks the flow of current between a power source and power consumer. In one embodiment this is simply a power transistor such as a MOSFET or IGBT controlled by a phase width modulation chip or circuit. In an embodiment a microprocessor or microprocessor function of another chip is used to control the transistor or other electronic switch.

Household Appliances that Work on Interrupted DC

The following appliances were tested and found to work well with interrupted DC power at 110 volts DC. The DC electricity interruption rate used to test-power these appliances was between 60-100 Hz and the off time was approximately 160 microseconds.

Coffee pot
    hair dryer
    waffle maker (800 watt)
    3 gallon water heater
    40 gallon water heater
    4 gallon water heater
    infrared space heater (800 watt)
    electric grill (600 watt)
    electric grill (1400 watt)
    kotatsu space heater (300 watt)
    induction stove (800 watt)
    computers via their power adapters (Dell, HP, Apple)
    computer printer via power adapter (HP)
    5 volt USB power supply adapter
    hand electric drills
    vacuum cleaner (1000 watt)
    small 100 watt high speed drill,
    and hand electric sander.

Higher Interrupt Frequencies are Preferred.

Further experiments done with a space heater, an electric drill, and with a computer power adapter as representative appliance loads showed that appliances worked just as good or even better at higher frequency interrupted DC power, particularly above 250 hertz, and even better at above 500 hertz and particularly above 1000 hertz interrupted power. The interrupt (off time) preferably was less than 1% of the cycle (periodicity) time and more preferably less than 0.5% of the cycle.

A limitation to consistent higher frequency interruption was that at some high frequencies the appliance begins to resonate. For example, a space heater started to sing at about 9000 hertz interruption, over a wide range of off times down to 0.25% (99.75% duty cycle), while powering up and operating properly. In this context, a randomly varying frequency of interrupt (for example randomly varying from 5 kHz to 25 Khz, from 20 kHz to 50 Khz or from 1 kHz to 10 KHz as a skilled artisan can contrive from a circuit) would work best at a range of at least 2 fold and more preferably at least 5 fold range of higher interrupt frequencies (minimum 500 Hz) for a variety of appliances.

Interrupted DC Power on Switches, a Special Consideration

The above listed appliances contain circuitry to convert AC to DC (computer adapters for example) or are already compatible with DC (water heaters, coffee makers, brushed motors etc). However, their power switches and internal thermostat switches are not compatible with 100-120 volts high DC currents. A major limitation is that switches designed for AC power get much bigger sparks and thus are derated (typically by a power factor of 4 or more) for DC. That is, use of regular uninterrupted DC to an appliance having a mechanical switch makes a big spark during switch off (interruption of the current), which causes lifetime limiting wear. This is especially a problem for heat-based appliances such as water heaters and many kitchen appliances that cook food, which have internal thermostat switches that may fuse closed at the on position from switch contact welding.

It was discovered that interrupted DC can flow through such switch with significantly less sparking than regular 60 Hz AC power, for the same wattage load. Because of this, smaller less expensive on-off switches and thermostats may be employed for circuits and appliances that operate on interrupted DC power, particularly at interruption rates of 500 Hz or higher. Preferred is the use of a more durable material for the cathode of such DC switch, such as copper, nickel, tungsten, rhenium, molybdenum, tantalum and particularly a ceramic material such as silicon carbide or boron carbide.

Effect of Interrupted DC Power on Spark Formation

Spark size was measured by integrating light from a light sensor positioned near the spark gap formed when switch contacts are opened. A Leviton brand single pole single throw designer series switch rated for 20 amps AC 120-277 volts was obtained from Home Depot. A hole was drilled in the side wall of the switch closest to the switch contacts. A large surface area silicon photocell model BPW34 with 7.5 mm square light sensitive surface was inserted into the hole, fixed with epoxy, and covered with black tape. The output from this PIN diode was fed into an op amp integrator with a reset button and the integrator output was buffered by a second op amp with two times voltage amplification. The voltage output drifted less than 1 millivolt per minute.

Spark sizes were measured as follows. To take a measurement, the integrator was zeroed out and then the switch slowly turned on and off 80 times to connect a 100 volt RMS power source to a 300 watt infrared heater resistance load. An integrated light measurement signal voltage was recorded for each switching event and the results were averaged.

Interrupted DC was generated by an adjustable PWM circuit switching a MOSFET in the power line in series with the mechanical switch. The frequency of interruption and the interrupted duration were independently varied while feeding 100 volts DC into the 300 watt infrared heater.

For comparison, sparks produced from 60 Hz AC power and from square wave AC power were also measured as output voltage from the integrator circuit, as listed in the table below.

Results: Comparison of 60 Hz AC with Interrupted DC Power

| Interruption Frequency (Hz) | Interrupt Off time (uS) | % off time | Averaged Spark size (Voltage) |
|---|---|---|---|
| 60 Hz (AC reference) | | | 0.483 |
| 60 Hz DC | 120 | 0.72% | 5.0125 |
| 60 Hz | 240 | 1.4% | 3.96 |
| 60 Hz | 480 | 2.9% | 2.38 |
| 60 Hz | 960 | 5.8% | 1.79 |
| 120 Hz | 60 | 0.72% | .380 |
| 120 Hz | 120 | 1.4% | .432 |
| 120 Hz | 240 | 2.9% | .472 |
| 120 Hz | 560 | 6.7% | .502 |
| 160 Hz | 50 | 0.8% | .213 |
| 160 Hz | 100 | 1.6% | .155 |
| 160 Hz | 200 | 3.2% | .142 |
| 160 Hz | 400 | 6.4% | .149 |
| 160 Hz | 800 | 12.8% | .104 |
| 200 Hz | 40 | 0.8% | .118 |
| 200 Hz | 80 | 1.6% | .116 |
| 250 Hz | 50 | 1.25% | .124 |
| 250 Hz | 100 | 2.5% | .065 |
| 250 Hz | 200 | 5% | .070 |
| 250 Hz | 400 | 10% | 0.046 |
| 300 Hz | 35 | 1.0% | .056 |
| 300 Hz | 50 | 1.5% | .061 |
| 300 Hz | 100 | 3.0% | .041 |
| 500 Hz | 40 | 2% | .018 |
| 500 Hz | 80 | 4% | .0195 |
| 50 Hz AC Square wave | | | .347 |
| 60 Hz AC Square wave | | | .256 |
| 80 Hz AC Square wave | | | .113 |
| 100 Hz AC Square wave | | | .049 |
| 120 Hz AC Square wave | | | .052 |
| 250 Hz AC Square wave | | | .009 |

Figure 1:
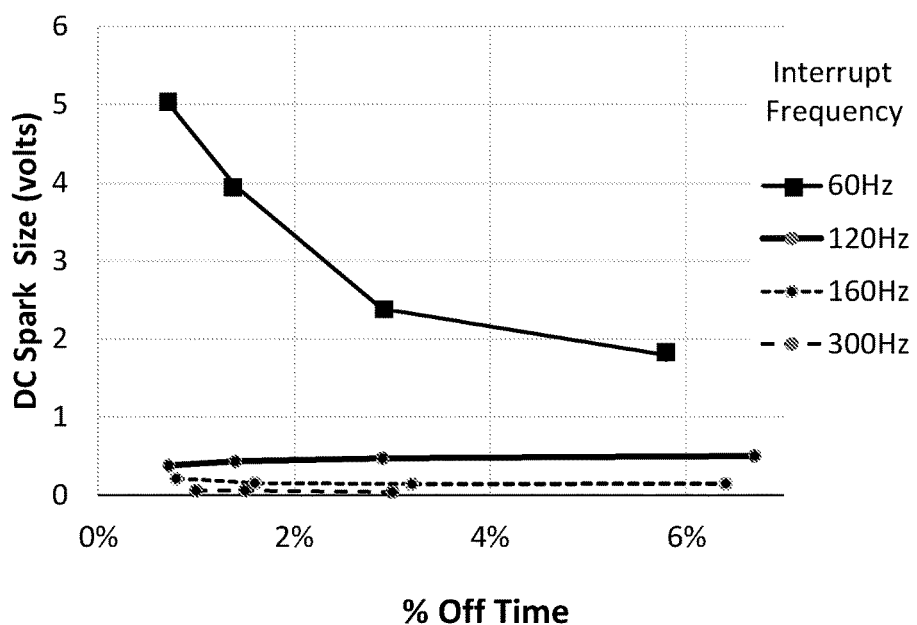
FIG. 1 shows the effect of interrupt frequency and off time on integrated spark size detected as voltage output.

These data indicate that sparks could be suppressed as much as 5 to 10 times if the DC current is interrupted at least about 250 times per second. An important consideration was how much the off time affects spark suppression. As seen in FIG. 1 the off time is not very important except for very slow interrupt intervals. The average spark size for 60 Hz AC in this example was 0.483 volts. Increasing the off time for 60 Hz interrupted power failed to reduce spark size to this value. And higher interrupt frequencies of 120 hertz and greater did not appreciably benefit from an increased off time. Although not shown on the graph, shorter off times of 0.5% and less (equal or greater to 99.5% duty cycle) were successively used at the frequencies, and well above 5 KHz interrupt frequency.

Figure 2:
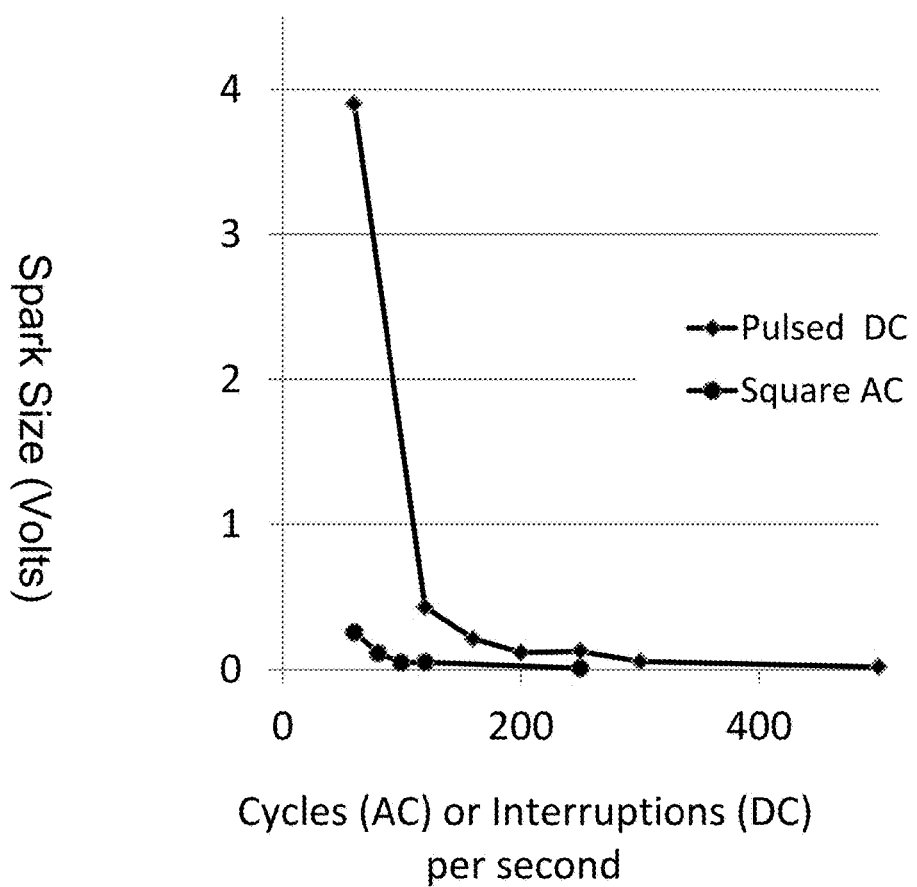
FIG. 2 shows the effect of interrupt frequency for DC power, and the effect of frequency for square wave DC power on spark size.

In comparison to off time, increasing the interrupt periodicity had a big impact, as can be seen in FIG. 2. Shorter interrupt frequencies were not documented because the spark size became big and might damage the switch contacts. This graph shows that interrupt frequencies of at least 150 Hz suppress spark size to less than that produced by 60 Hz AC power of the same RMS voltage and current to the same appliance.

Visual Confirmation of Diminished Spark Size with Increasing Pulse Rate

An examination of increasing pulse rate, from 60 Hz to 9 kHz was done using a Panasonic 10 amp, 300 volt switch model WS30001W. Visual confirmation was carried out in a darkened room, by looking at the switch contacts from 6 inches away through a cut out portion of the switch case. At low frequencies the sparks were very large but as the frequency was increased the spark sizes greatly diminished such that at the highest up to 50 kHz the sparks were barely recognized.

As was found with the photodiode voltage measurements, spark size was highly variable, presumably because each particular switch opening occurs during a random point in a periodic on-off cycle. This was also true for the 60 Hz AC control switched sparks. At the moment of switch opening, much bigger sparks are expected to occur at a point of maximum voltage and current flow. However, no or almost no sparks are expected to occur when a switch opening occurs at a voltage crossover event (for AC switching) or zero voltage event (for pulsed DC switching).

Studies with a Hair Dryer Load

This example used the same switch and voltage measurements but was carried out with an 800 watt hair dryer load. Square wave AC power at different frequencies was compared to interrupted DC power at approximately 1% off time (99% duty cycle DC power). Averaged data are presented below:

| Frequency | Average Spark Size (Voltage) |
|---|---|
| 50 Hz AC square | .625 |
| 60 Hz AC square | .390 |
| 100 Hz AC square | .123 |
| 250 Hz AC square | .008 |
| 60 Hz DC | .870 |
| 120 Hz DC | .182 |
| 160 Hz DC | .097 |
| 200 Hz DC | .054 |
| 250 Hz DC | .043 |
| 300 Hz DC | .032 |
| 500 Hz DC | .019 |

Figure 3:
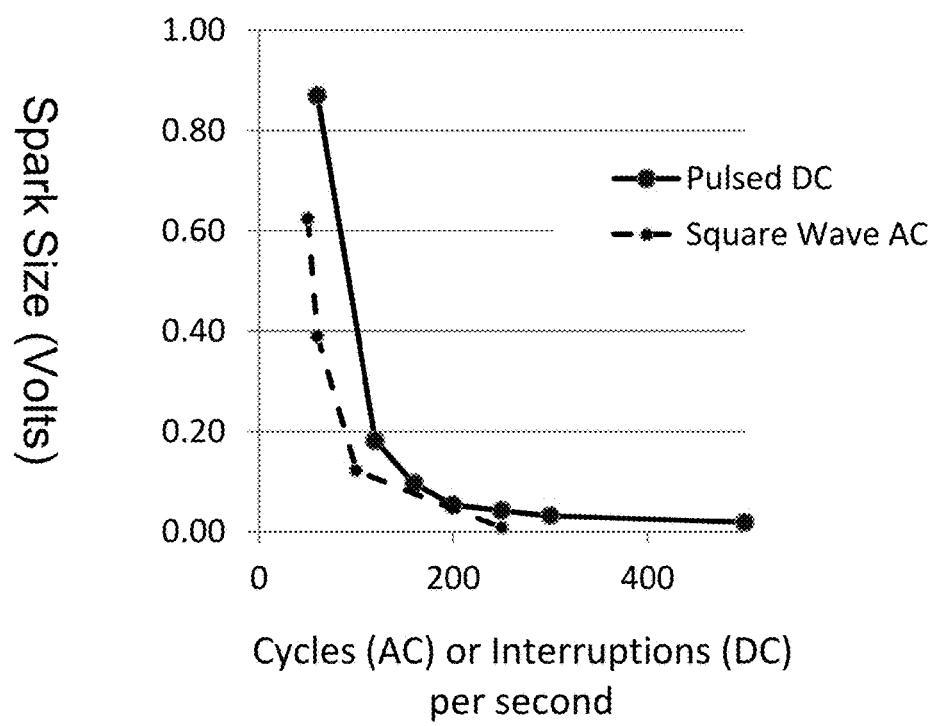
FIG. 3 shows the effect of frequency on spark size for a hair dryer power circuit.

Data from this example are shown in FIG. 3. This shows that the relationship of decreasing spark size with increasing interrupt frequency is found at higher power levels for this different kind of appliance. Surprisingly, square wave AC power yielded even smaller spark sizes when switched at the same frequencies.

Powering a Computer with Interrupted DC

A 15 inch 90 watt Dell Laptop computer was powered via its 19.5V 4.5 Amp adapter. A Hanson DSO5062 oscilloscope was used to analyze harmonics in the 19.5 Volt power supplied to the computer from the adapter. The 19.5V electricity fed to the computer from the adapter using a 100 Volt 60 Hz power source was compared to that obtained using 60 Hz interrupted DC (160 uS off time) power source. No differences (virtually no harmonics in the output power in both conditions) were found.

Next, the efficiency of power consumed by the computer adapter from regular 60 Hz AC was compared to that from interrupted DC. Because computer power consumption fluctuates, a 7.5 ohm resistor was used to load the 19.5 V computer adapter to provide a constant 2.6 amp power drain (50.7 watts) from the adapter. Current flowing into the adapter was measured using 0.5% precision resistors and the RMS voltage into and out of the adapter was measured with an overall accuracy of about 1%. Under these conditions of 50.7 watts consumption, 78.5 watts of 60 Hz AC power were consumed (adapter efficiency=64.6%) When 100 volts of 60 Hz interrupted DC (75 uS off time) were supplied to the adapter, the adapter power consumption was 73.1 watts (adapter efficiency=69.4% efficiency).

The accuracy of both voltage and current measurements made in this study was about 1%. Therefore the increased efficiency using interrupted DC (69.4% vs 64.6% from AC power) appears significant. This efficiency increase should produce a slight corresponding decrease in adapter temperature.

The significant efficiency increase (69.4% vs 64.6%) was unexpected. Without wishing to be bound by any one explanation for this result, it is suggested that the power adapter may include passive components required to remove the 60 cycle waveform and also to remove the odd harmonics generated when power diodes chop AC to DC. Further, the interrupted DC presents less harmonic load and also less need for power factor correction, to the adapter. In particular, the adapter (which normally has to convert AC to DC) necessarily produces unnecessary harmonics via diode conversion of AC to DC in the adapter.

Such harmonics form due to the voltage drop across power diodes, which prevent a true zero crossing polarity switching, but instead diode switching approximately 0.7 volts on either side of zero crossing, for the AC power. In this context, the inventor notes that the electric power regulations focus on minimizing the harmonics. Generally, total harmonic distortion must be less than 5% for many conditions, and less than 3% for any one harmonic. And, the international regulations further regulate odd harmonic regulation, which are caused by this non-linear chopping process from diode action. Use of DC supplied power eliminates much of the unnecessary harmonics generation and removal.

One advantage of supplying DC appliances (such as computer power supplies) with DC instead of AC could be the removal of the wasteful DC to AC conversion process. Many appliances such as TVs, computers etc. that receive AC power initially have to rectify the AC with at least two power diodes. Each diode typically consumes about 0.7 volts (1.4 volts power loss for simultaneous use of two diodes). Appliances such as electronic equipment with built in voltage converters (or with power adapters such as used by laptops and cell phones) thus necessarily waste approximately 1.4 volts (just over one percent) by having to convert AC to DC. Power factor corrections caused by the use of alternating electricity further reduce efficiency.

In an embodiment interrupted DC power is supplied to an office, or data center for compatible use with laptop power supplies and/or cell phone power supplies to save energy due to the higher efficiency of usage compared to AC power.
Circuit Breakers with Interrupted DC Data from the spark size experiments indicated that sparks could be suppressed as much as 5 to 10 times if the DC current is interrupted at least about 250 times per second.

To test the principle of DC spark reduction with circuit breakers, a 100 volt 20 amp AC circuit breaker (Panasonic BS1112) was modified by installation of a photo diode as described in the above spark experiments. The BPW34 photocell was epoxied into a hole drilled into the side of the circuit breaker. Light from spark flashes was integrated as described. A 100 volt power source (either square wave AC or DC at different pulse rates) was applied and the circuit breaker used as a switch to a non-inductive 1000 watt load. The breaker was manually switched to produce sparks, which were integrated and spark size averaged.

Figure 4:
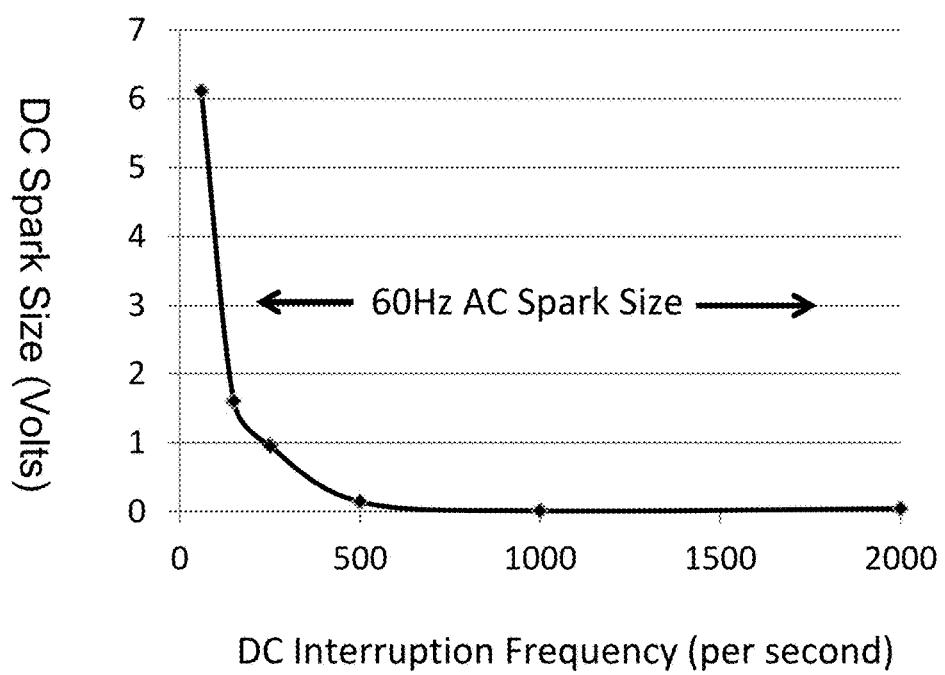
FIG. 4 shows the effect of interrupt frequency on integrated spark size for a circuit breaker switch at a 10 amp power flow.

FIG. 4 summarizes the results. The X axis represents interrupt frequency in interruptions per second. The Y axis represents measured integrated voltage (as averages) for a single switch opening event. This figure shows the same relationship found in the previous switch study, wherein 60 Hz interrupted DC power generated bigger flashes at the switch contacts inside the circuit breaker than that from 60 Hz AC power. Similar to the previous switch results, an interrupt of 120 Hz or greater allowed sparks similar to but smaller than that made from 60 Hz AC. This shows that spark damage can be severely decreased by interrupting the DC by a periodicity of at least 120 hertz, and way below the AC spark level at more than 500 Hz.

Due to the spark problem limitation of AC switches for DC power, DC circuit breakers for the same voltages and currents cost much more than AC circuit breakers. Configuration of a lower cost AC circuit breaker design or switch contacts to operate with similar or higher current DC power circuits, could provide cost savings. This has become very important in the solar electric field, where high current DC circuits are common and need switch and circuit breaker protection.

These data indicate that interrupting DC at high currents are compatible with electrical contacts of AC circuit breakers for protecting equivalent sized DC loads from DC power sources to a connected load. In a desirable embodiment the DC power source is interrupted by at least 250 Hz, preferably by at least 500 Hz, more preferably at least 1000 Hz. In an embodiment, an AC relay or breaker is modified by adding a DC current interrupter in series with and between the DC power source and the AC relay or breaker. Preferably the negative side sparking contact (cathode) is made of a more durable material than the anode to prevent decomposition from electrons leaving the surface from sparking.

Examples and Embodiments Applied to Local Grid and Outlet Hardware

Robust Local Grids: Eliminate or Minimize Charge Controllers, Inverters, and Converters Much if not most cost, complexity and reliability issues in solar electric power systems arise from the need for multiple circuits within charge controllers, inverters and converters, to serially massage the solar electric energy into suitable forms. In embodiments, low cost, low complexity and high efficiency are obtained by choosing a solar panel system voltage that is only nominally higher than the end-use power voltage, and using pulsing direct current from this matched power to run appliances. For a 100 to 120 volt system, preferably, the solar panel system voltage is between 105 volts and 145 volts, determined as maximum power point voltage at 25 degrees Celsius for panels connected in series. More preferably the solar panel system voltage is between 10-20 volts higher than the end-use power voltage. For a 380 volt system used in for example computer server centers the system panel voltage preferably is 30-80 volts higher.

In a preferred embodiment, the end-use voltage is about 100 volts (between 98 and 108 volts, more preferably between 100 to 105 volts in the case of Japan, and is about 115 volts (between 110 and 125 volts) in the case of the United States. In an embodiment that uses common silicon panels with Vmax voltage loss due to high temperatures, solar panels may be grouped in at about 10-25 volts higher. Solar panel voltage loss due to high temperatures can be accommodated and the solar panel output can be fed to the end-use power with a simple PWM circuit or the like that generates a pulsed DC power or square wave AC power. For pulsed DC or AC in an embodiment, the PWM circuit preferably has at least a 0.1% off time (maximum 99.9% duty cycle) and the duty cycle can be adjusted as desired to match the slightly higher solar panel voltage with end use appliance voltage. In a preferred embodiment the end-use voltage is about 230 volts. Solar panels preferably are connected in series to about 250-280 volts in an embodiment, or configured with an MPPT controller or the like to feed the appropriate voltage.

DC Pulsing-Switching to High Power Appliances

As described above, pulsed DC is preferred for many house appliances. In a related embodiment the DC is pulsed alternately in both directions. When the duty cycle is 100%, this is a regular square wave AC. The duty cycle preferably is altered (at least 1%, preferably at least 3% off time) in embodiments to control power input loading and output voltage. In such cases the off time (between switching from one polarity to the other) is increased to achieve lower loading, and lower output voltage, respectively. For the latter, capacitance may be added for smoothing the voltage.

In an embodiment shown in FIG. 7, a DC switcher circuit 510 includes a PWM controller 540, which provides a switch square wave pulse between 25 and 1000 Hz to MOSFET 550 with optional current feedback loop 520 and sensor 530 to load 545. Preferably the controller includes a feedback circuit that responds to a decrease in supply voltage by decreasing duty cycle. For example, when attached to a grid node with a target voltage of 105 volts, if the node voltage goes below 105 volts (or other set value such as 103, 102, or 100 volts) the DC or AC switcher circuit decreases duty cycle to compensate. The popular TL494 PWM chip can easily implement this with one of its error amplifiers using sampled input voltage compared with a 5 volt reference. Desirably a microprocessor such as a PIC controller can carry out much or all of the circuitry functions as a skilled artisan readily will appreciate.

Load Connections to and from the Grid

Preferably DC electric energy from the grid is converted into pulsing DC or square wave AC (of optionally varying duty cycle) by a circuit within an outlet receptacle or other enclosure so that regular switches and breakers and thermostats can work properly without becoming welded shut from the high DC currents. Preferably a high current load having such switch which is designed for alternating current loads is connected to the DC grid via square wave AC or a phase width modulated pulsed DC of at least 10 hertz, preferably between 25 and 2000 hertz and preferably between 250 and 1000 hertz with a short off time duty cycle such as between 0.1-1% and more preferably between 0.0% and 0.5%.

The pulsed DC power or AC square wave power need not be strictly square wave but modified square wave can be used (as is known in modified sine wave inverter technology). Other forms are acceptable if voltage at some point in the cycle becomes near to or reaches zero, as suited to prevent spark formation during mechanical switching. In an embodiment for low priority loads such as water heaters, electric heaters and even some air conditioning DC pumps (which normally modulate between 40% and 100% power anyway) the duty cycle is controlled in response to grid or solar panel voltage, so that power supplied to the load adjusts to help maintain a suitable grid or solar panel voltage.

Low current loads (which are often high priority and may be serviced by a separate wire pair) preferably are not so modulated. Examples of low current loads include computer, printer and monitor adapters (which don't use traditional transformer voltage conversion), which can be directly plugged into DC power. Other low current loads can include lights, and battery charging. In an embodiment, low current loads less than 3 amp, 2 amp or in some cases no more than 1 amp (preferably between 50-200 volts) such as a cell phone charger, lap top computer, LED lighting, and the like are supplied with constant current DC power. High current loads that have mechanical thermostats or other switches preferably are supplied with pulsing DC or square wave AC to protect those switches. In an embodiment all DC loads are supplied by pulsing DC power and also to a DC outlet that monitors for inductive loads by switching off or switching to alternating current when incorrect inductive loads such as transformers or AC induction motors are used.

Square Wave AC Power

In an embodiment more acceptable to current regulatory practice, a square alternating current ("AC") wave or modified sine wave is used instead of a pulsed DC wave. Examples of square AC waves are shown in FIG. 5.

Figure 5:
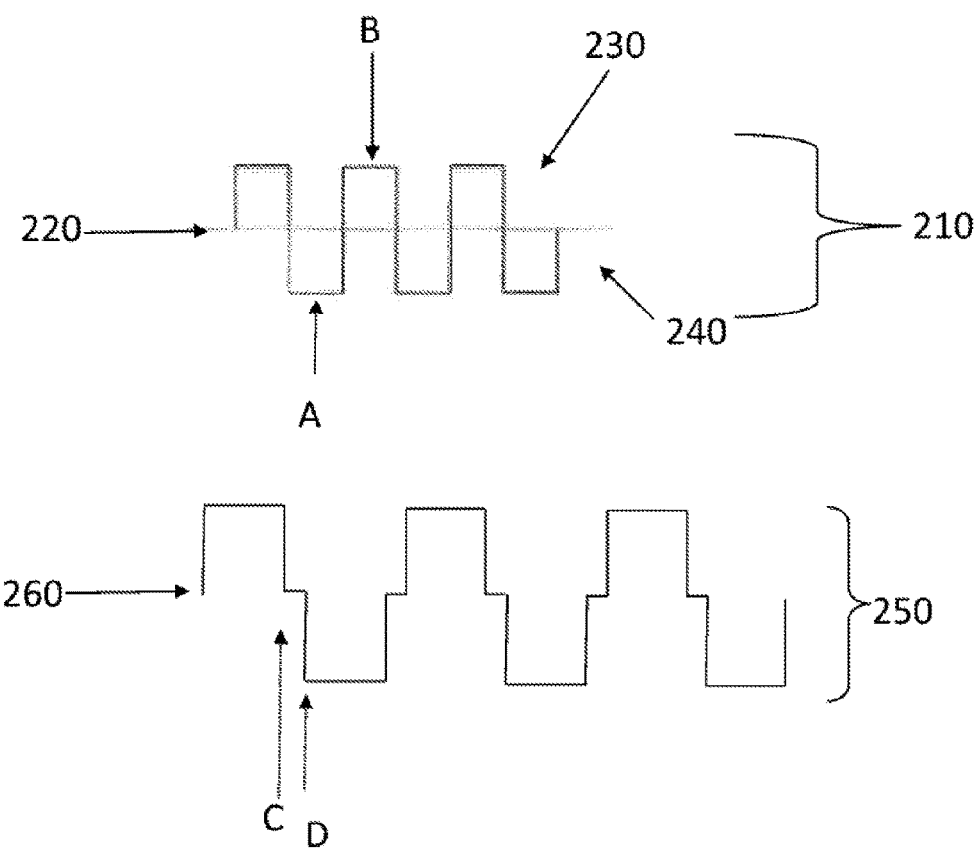
FIG. 5 shows an AC square wave (I.e. pulsed AC) with 100% ideal duty cycle and an AC square wave with less than 100% duty cycle.

The top of FIG. 5 shows a traditional square wave 210 that alternates above (+ voltage) and below (− voltage) a zero point, shown as arrow 220. The X axis of this graph is time, and a complete cycle is 1/60 of a second. In embodiments, the magnitude of the plus and minus voltages 230 and 240 are controlled as described for pulsing DC control, to achieve prioritization, as RMS voltage differences will determine magnitude and direction of current in grid and grid connected circuits.

In a desirable embodiment shown in the bottom half of FIG. 5, the alternating square wave 250 has an off time at the zero crossing point 260 with a complete cycle time of 1/60 of a second. The two vertical lines C and D show beginning and end points of an interval of zero or near zero voltage C and D, with is an optionally variable off time. Because of the off time (less than 100% duty cycle), the square wave portions shown here are shorter than showed above as 210 and have a primary frequency higher than 60 hertz. In an embodiment the duty cycle is about 90% and the frequency spectrum is about 66 hertz, 198 hertz, 330 hertz, 462 hertz etc. In desirable embodiments at least some of the 198 hertz and above power components are selectively removed (with respect to the fundamental 66 hertz) to improve the quality of the power supplied to appliances. These higher frequency components can be removed by passive devices such as capacitors and inductor tuned filters, and can be removed by active devices, such as a transistor driven load that is modulated by a composite signal of the power, minus the fundamental, as exemplified below.

In an embodiment the optionally variable off time interval C-D is varied to achieve regulation of the power source and/or is varied to achieve regulation of the output current or voltage. For example, when powered by solar panels, the off time may be increased to decrease load on the panels (or decreased to increase load on the panels) to move their output voltage closer to an optimum Vmax voltage. In an embodiment the off time is varied to adjust input load voltage away from Vmax in order to prioritize load usage as described in the specifications that are incorporated by reference. In an embodiment the off time is adjusted between 1 and 20% and in another embodiment the off time is adjusted between 3% and 80% or more. Other ranges can be easily achieved as a skilled artisan readily will appreciate.

In a desirable embodiment, the frequency of alternating voltage (from plus to minus and back again) is held constant to about 60 hertz or about 50 hertz but the off time is modified for regulation. In another embodiment the frequency is altered and off time is altered.

Electrical Resilience Apparatus ("ERA")

In an embodiment a local user has an electrical box for providing at least some of his own power off-utility grid from connected power supplies such as solar panels, wind turbines, electric car batteries, fuel cells, and the like, and which optionally may be connected to a local DC grid. This local use electricity box ("ERA") may be mounted to the outside of a building in a weather proof configuration and may contain one or more additional components such as a. sensors for repeated measurement of voltage and current though the box to/from a local grid, b. power usage recording device such as a downloadable memory that records voltage and current at periodic intervals, c. internet connection, d. cell phone connection to report power usage and/or offers and acceptances for power sales and use with other grid members, e. sensor/tester to determine resistance to the adjacent connected node and f. automated current governor that prevents overload of grid connection wires by monitoring current and limiting current from the node via PWM decrease in duty cycle or other limiter.

Figure 6:
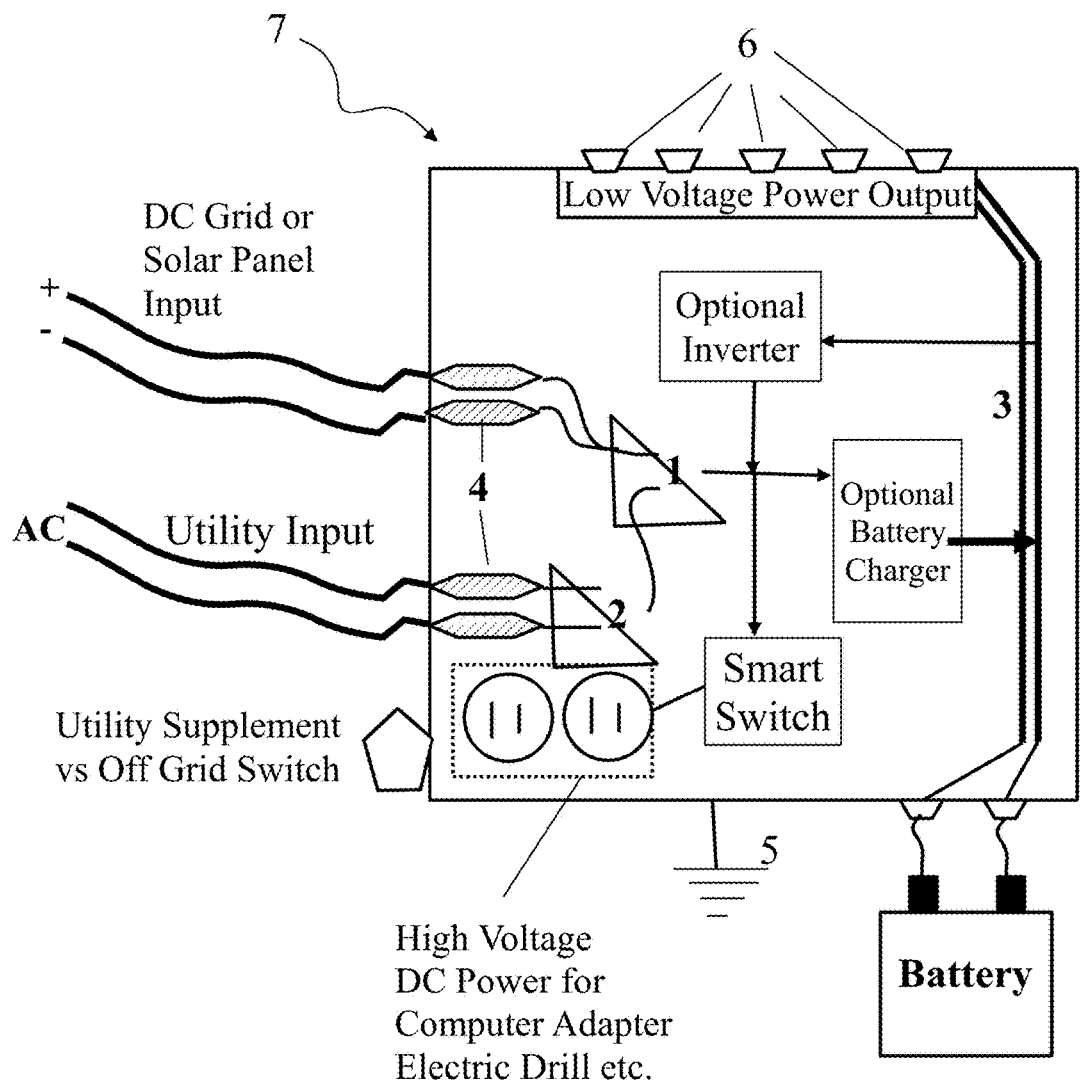
FIG. 6 shows a representative entry level power device for providing reliable direct current power.

A particularly desirable ERA embodiment that can serve as a stand-alone energy device or as a grid node connection device is shown in FIG. 6. This figure displays an ERA depicted as box 7, but which can exist as separate devices wired together at the same or at disparate locations. Preferably a DC grid connection together with a local solar power connection (and optionally wind power input connection) are included but only one DC Grid or Solar Panel Input is shown here.

Box 7 includes at least one DC to pulsed DC (or square wave AC) circuit with input voltage feedback control. In a first prototype, this circuit was located in circuit 1 (see as a triangle) in FIG. 6. This pulsed circuit preferably is a phase width modulation ("PWM") driven power switch (such as MOSFET or IGBT) that is controllable. In an embodiment, the control of threshold voltage feedback control at circuit 1 is carried out by a switch, to allow activation of pulses above a given input voltage, with selection between two priority levels. A lower threshold level provides higher priority because the power is used (converted to PWM pulses) down to lower input voltages and a higher threshold voltage level is used for lower priority loads, which are only provided power when higher input supply voltages are available. In an embodiment a power bus 3 connects low voltage power outputs to a battery. In an embodiment, a user switches between two priorities, or even three priorities or more, which optionally are available in real time or variably during scheduled times. The switch may be via push button, toggle switch, or the like, or may be selected by internet, cell phone, or other wired or wireless signal mechanism.

In an embodiment the threshold controlled pulsing circuit only feeds the output (shown as "smart switch" in FIG. 6) and straight DC feeds the optional (if used) battery charger. In another embodiment a separate higher priority adjusted circuit feeds the battery charger and a lower priority adjusted circuit feeds the power output (smart switch) so that the battery is charged even at lower node voltages when lower priority loads are not supplied from the node.

In an embodiment, all DC inputs in the ERA are subjected to PWM (adjustable DC or adjustable square wave AC) control (see for example FIG. 7) and the controlled power is provided to one or more receptacles such as that shown in FIG. 6. In another embodiment, only the solar power input and/or connected grid input is PWM controlled by voltage. The utility and optionally connected local grid power is PWM controlled to provide pulses but are not input voltage controlled, in another embodiment.

In an embodiment, supplied utility AC power or inverted AC from battery or high voltage power is provided directly as AC (either square wave AC or modified AC or smoothed AC) to the receptacle when an appliance is set (user selection) or automatically detected as an AC appliance. In an embodiment a PWM controller supplies solar electric and/or battery energy from the ERA to the grid. In an embodiment this supply is carried out using output (connected grid) voltage feedback to achieve a sufficiently high local node voltage. In an embodiment this supply is carried out using input voltage feedback to achieve more optimum loading of the power source, because both battery and solar panels should not be overloaded for maximum efficiency. In a desirable embodiment, both load voltage and input voltage are used to control duty cycle in the PWM circuit. In another preferred embodiment, the PWM circuit that provides pulsed DC power for local use at the ERA monitors output current and controls for (limits) maximum current.

In embodiments one or more of these input lines is earth ground default protected by optional sensor/interrupter 4. An optional connection to earth-ground 5 is shown at the bottom of this box. Also, in a preferred embodiment the AC utility input is provided from an isolation transformer and there is no direct connection to the utility and the utility ground.

The AC utility input is converted to DC at circuit 2 and both sources are combined in parallel at section 1 in this diagram. Although not shown here, one or both of these inputs can be modulated (for example by PWM) to limit their input, although this is not preferred for the simplest embodiments. A user operated switch is shown on the lower left, which allows a user to select to go off grid (no power flow connection from the utility input) or to allow both powers to be used simultaneously. For example, preferably the DC input power is at a higher voltage than the rectified AC utility power and connected in parallel. In this case, the DC input power preferentially is used to power the battery charger and the DC power outputs to LEDs and to the high voltage receptacle with no utility power usage. When the power consumption rises enough to become greater than the DC power input, the voltage drops until the voltage (at triangle 1 output in the figure) reaches the rectified utility power, at which point both sources are used simultaneously.

Preferably a user alert such as bar LED displays or even a simple neon light for both power sources visually alerts the user when one or the other input is being used to provide power to this apparatus. An embodiment provides a user switch to disconnect from the local grid. In many embodiments however, the local grid and (backup) utility grid and even solar panel inputs are all connected in parallel, with reverse blocking diodes added as necessary to prevent power backflow into the solar panels and utility. Preferably only the locally connected solar electric (or other local node power source as listed above) is allowed to flow into the local grid connection, when the voltage is suitably high enough. In an embodiment a local node connected battery is switchably (user control) allowed to flow into the local grid to supply backup power to neighboring nodes.

The high voltage output power from 1 feeds a battery charger and a high voltage DC power outlet for one or more appliances. Optionally, as shown in this figure, the high voltage power to the high voltage DC power outlet is controlled by a smart switch to ensure that an improper appliance, such as a transformer adapter, AC induction motor or other high speed AC motor is not powered long enough to burn out. In such case, a regular (preferably 15 amp) receptacle is used to allow simple plugging in of the DC powered appliance such as a computer power adapter. In an embodiment, a switch is provided for flipping the polarity of the high voltage DC output, or this is switched automatically upon sensing that a plugged in power adapter needs to be reversed. The inventor surprisingly discovered that some power adapters rectify and use their AC input in a directional manner, and need to be plugged in with the correct negative and positive orientation. To accommodate this, the smart receptacle may test both directions of DC current flow and switch to the direction that yields current flow via a sensing and control circuit.

The battery charger accepts the high voltage DC power, which may be pulsed at this point by circuit 1 and converts to a lower voltage suitable for charging an attached battery as shown. In an embodiment, however, the DC power is at least 104 volts and charges eight 12-volt lead acid batteries connected in series, and the "96 volt" battery in this case is used directly to feed the high voltage DC power outlets without further conversion except for pulsing. In such case optionally the battery charger lacks an inductor based buck or boost circuit and more efficiently charges the battery by modifying the duty cycle of a higher voltage applied charging voltage. This allows a 96 volt lead acid battery bank to be used as a preferred night power backup for a local grid and/or for such use at just the node itself. In this case the high voltage battery can be connected in parallel with the other high voltage inputs to the high voltage DC output receptacle, and a typical (buck converter type) 12 volt output adapter can be used to provide the 12 volts from the high voltage battery. Of course, other voltages such as 24 volts may be used instead, particularly for LED lighting. In a preferred embodiment the high voltage DC (eg. 100-120 volt RMS DC) charges the low (12, 24, 48 etc. battery) directly via PWM pulsing directly without use of inductor or buck conversion at less than 25% duty cycle and particularly less than 8% duty cycle and even less than 5% duty cycle.

The connection to DC local grid preferably is not one way but preferably a separate solar panel input is tied to the DC local grid at circuit 1. Preferably current is allowed to flow in both directions based on voltage levels and operation of Kirchoff's laws. In this way, power will flow into the DC local grid from the connected system solar panels when the voltage on the local grid line from box 7 is higher than another neighboring node (after subtracting for voltage loss in the grid connection wire). This supply to the local DC grid additionally depends on whether the smart switch is not using all available power from the solar panel input. Preferably diode connections are made to prevent connected utility power from contributing to supply of excess generated power to the local DC grid in all circumstances.

This figure shows an optional low voltage buss vertically arranged at the right side inside box 7 and connecting the battery directly (or indirectly through a semiconductor switch that disconnects in the event of too low battery voltage) to the one or more low voltage power outlets 6 arranged horizontally along the top. Many users will want to use one or more of outlets 6 to run LED lighting but others may use one or more of these to exploit the large variety of 12 volt powered appliances such as car radios, ham radios, small water pumps and the like.

Smart Receptacle for DC or AC Power

Many modern devices (cell phones/computers) can plug into the DC grid directly if the voltage is not too high (typically less than 240 volts, preferably 100-120 volts). And, resistance heaters that have switches and/or thermostats work fine if the DC current is chopped (typically 3%-10% off time for 50-100 Hertz). In an embodiment, a power interrupter circuit is provided that supplies pulsing DC or square wave AC to appliances such as coffee makers, toasters, griddles, and hot water heaters, from direct current by thus interrupting the direct current power to the appliance by at least 10 hertz frequency, preferably between 25 to 1000 hertz and more preferably between 50 to 200 hertz. However, to prevent accidental use of an A.C. motor or old fashioned wall wart (transformer based power supply) the following smart receptacle is provided.

Figure 8:
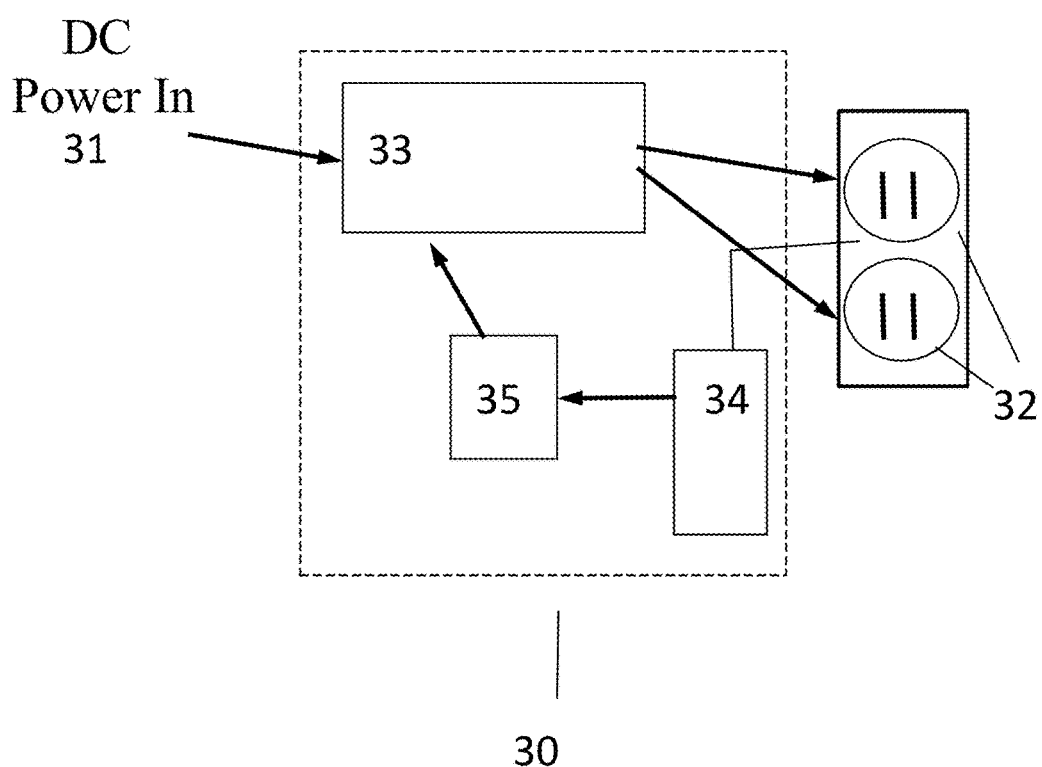
FIG. 8 is a block diagram of a smart outlet that senses an AC power load.

FIG. 8 shows a power outlet circuit 38 interposed between a DC power source 31 (typically a pulsed DC power as described above, or a direct connection to a grid or high voltage battery as outlined above and below) and a standard 15 amp or 20 amp AC outlet 32. Outlet circuit 38 connects to input DC power 31 and outputs to power plugs 32. An electronic valve 33 (preferably a MOSFET, IGBT or other solid state device or other circuit such as DC to square wave AC inverter) controls flow of power between input 31 and output power plugs 32. Sensor circuit 34 typically is connected to the output load and detects (preferably a minimum value) inductive load and if found, controller 35 turns off valve 33. In an embodiment sensor circuit 34 comprises a PN diode junction 36. In an embodiment valve 33 serves to create pulsed DC power from straight un-pulsed power in 31 and can be turned off by sensor 34 and controller 35, which may be as simple as a logic level output from a sensor circuit, or a transistor that drives an enable pin on a PWM controller of circuit 33 or the like. In an embodiment valve 33 is replaced by a DC to square wave AC circuit.

A microprocessor can infer electronic qualities of a load by receiving input of at least voltage, current flow and/or power or other sensed or calculated quantity over time and determine inductive load by looking for changes as described below. Typically a sensed or calculated signal indicative of connected inductive load is compared to a stored threshold value and triggers disabling of one or more outlets 32.

Each of these separately and/or in combination is a circuit. The inductance can be sensed a large number of ways including for example back (opposite) voltage spikes after the turn off known as "kick back." The term "circuit" used in this specification means electronic components connected as can be engineered by a hardware electronics engineer with at least 3 courses in circuit design in college and 2 years of experience and may represent a sub-circuit within a larger circuit. Also some or all of the operations of the circuit can be carried out in software by a microprocessor. For example, a microprocessor can detect a connection by software that repeatedly looks at conductivity between two points (the power plug 32). Upon sensing a connected appliance, a subroutine queries the connected device (senses resistance, inductance, and/or capacitance etc.) to determine the quality of the connected device During this time, an initial probe electricity can be used (such as low voltage of for example 5-50 volts) and not the total voltage (eg 120 volts) that the device may be designed for.

Pulsed DC and AC Power, Controlled by Sensing Kick Back of Connected Equipment

In a preferred embodiment, the smart outlet provides pulsed DC power and/or square wave AC power and senses kick back (also known as "back EMF" from motor windings, and well as other terms) from DC pulses. Preferably the power is a square wave train at a frequency of between 10 to 1000 Hz and more preferably between 50 to 200 hertz although other frequencies can be used. In a desirable embodiment the power is a square wave AC that generates kick back or other inductive effect, preferably after the leading edge of the square wave dispersion from zero volts. This preferably is sensed during the flat time of the square wave half cycle of the AC wave form. Preferably the duty cycle (% on time) is at least 50%, more preferably at least 85% and yet more preferably at least 95%. The kick back preferably measured is negative polarity spikes that occur immediately after the turnoff point of each cycle or return to zero voltage of the AC power cycle. A very simple and efficient method and device senses those opposite going spikes and responds by disconnecting the outlet (or turning off the DC pulse switch connection to high voltage DC power).

Preferably kick back is sensed during the off time, and preferably a back biased diode (which may be a junction of a larger device such as a MOSFET) is connected to allow electricity of opposite voltage to flow to the sensor. The sensed opposing polarity signal, which is preferably measured as a voltage, may be measured as a maximum spike, integrated spike, maximum or integrated voltage within a period of time that the DC power supplied is off (off time of a large duty cycle), a current spike, a power measurement, a magnetic field, or even a heat sensor for a low resistance in series.

In an embodiment, a threshold negative polarity (with respect to the DC output) voltage, or power, or both, is sensed and used to determine if the connected load exhibits a response above a set value. For example, a vacuum cleaner motor can easily generate back EMF (negative polarity) kick back pulses that are several times the voltage of the pulsing DC output. These typically occur slightly later than initial kick back from a transformer. A transformer kick back can be high at initial activation (first turn off intervals of a square wave train). On the other hand, upon turn on via a wave train, a motor at first is not moving, and then is accelerating (less than 10%, 5% or even 1% of maximum running speed), and a back EMF kick back pulse following each successive turn off slowly increases. This increase can be detected to distinguish over the transformer. Some motors (it was found) such as electric drills may not generate an appreciable back EMF, while pumps and especially high rpm motors generally do even move but generate significant kick back in this situation and can be distinguished.

The threshold value (voltage magnitude in the negative polarity) can be set above where a 100 watt computer power adapter would be, but below what a connected AC induction motor or small transformer such as a wall AC adapter would generate. In an embodiment, a motor such as a vacuum cleaner motor can be used on the pulsing DC by operation of a defeat switch or sensitivity setting (which can be built in) that allows the motor to operate when plugged in, but does not allow an AC transformer to operate. For example a vacuum cleaner or related DC/AC motor can be distinguished from a transformer by the gradual change in reactance that occurs while the motor is increasing speed from the instant of turn-on whereas a transformer would not exhibit such change. By monitoring a decrease in total reactance (consumed starting power for example) during short times such as 0.05 seconds, 0.1 seconds, 0.2 seconds, or 0.5 seconds commencing from turn-on, a vacuum cleaner can be distinguished.

A skilled artisan readily will appreciate how to build a circuit (which preferably may include a microprocessor) that senses negative going kick back spikes. Preferably the kick back sensing occurs only during the off time of the pulsed DC or shortly after return to zero voltage of an AC power cycle and preferably emphasizing the early off portion of that period, since that is where the kick back occurs (upon collapsing of the magnetic field of the connected inductor). The term "early off time portion" in this context means the first 50%, first 20% or even more preferably the first 10% or less of the off time commencing with DC power turn off time (or AC cycle return to zero time) of the duty cycle for long time duration (slow) pulses but preferably is measured during the off time part of the duty cycle for one, two, three, four or more of the first cycles after turn-on.

For the case of a square wave or modified sine wave, the term 'early off time" means the portion of time immediately after the swing of voltage back to zero crossing as exemplified as A, B and C in FIG. 5 and preferably less than 30% of the cycle, more preferably less than 5% of the total cycle time from the time of the voltage dropping back to zero. When the off time is used for the embodiment of less than 100% duty cycle, the preferably is detected during the off time (between C and D of FIG. 5). Otherwise (as shown in the top of FIG. 6, the pulse may be detected as an overshoot of the subsequent reverse voltage swing.

Response to Kick Back and Other Measurements

Upon sensing a critical level of kick back or other parameter indicating an inductive load such as a transformer or induction motor based pump, the circuit preferably disconnects power to the receptacle and alerts the user via a visual and/or audio signal. Preferably, the user resets the switch by activating a button and optionally by having to unplug and then plug in again a load to the receptacle.

In an embodiment, upon sensing an inductive load such as a transformer, the smart switch responds by disconnecting the (preferably pulsing) direct current power (or not turning this power on) and by connecting alternating current power to satisfy the detected AC appliance. Preferably the smart plug indicates the existence of sensed DC or AC power with indicator lights. Preferably, upon disconnection of the appliance, the smart plug resets and will initiate a new test for the next appliance power request.

In an embodiment the smart plug will accommodate appliances that require DC power of a given polarity. For example, some computer power adapters accept electricity when plugged in at one orientation, but when the adapter plug is inserted in a 180 degree opposite orientation, the power is not accepted, because of diode(s) within the adapter. This is also found in many infrared heaters that have half-power settings wherein the half power is achieved by switching in a diode to only allow one half of an alternating current to heat the heating coil. When using these heaters at half power, the heater sometimes will not work at the half power setting until the power plug of the heater is reversed. To accommodate this issue, an embodiment of the smart plug will test the appliance to determine if the appliance is wired to preferentially use one polarity over the other. This can be done by asserting one polarity power test voltage and then the opposite, and determining which is accepted by the appliance. In another, lower cost embodiment, a dual power outlet is provided, wherein one of the outlets is wired opposite polarity to the other, to allow the user to reverse polarity manually.

The following appliances were found to work well with pulsing DC power at 110 volts, and did not exhibit kick back pulses: coffee pot, hair dryer, infrared space heater (800 watt), 600 watt electric grill, 1400 watt electric grill, 300 watt kotatsu heater, 800 watt induction heater stove, computer power adapter, computer printer adapter, 5 volt power supply power adapter, and hand electric drills. The following appliances also worked well with pulsing DC power at 110 volts and exhibited back EMF that could be distinguished over that from a transformer or AC induction motor: vacuum cleaner, small 100 watt high speed drill, and electric sander. The following appliances were tried but did not work suitably on pulsing DC: 18 volt 10 watt transformer, small aquarium pump, and small 160 watt refrigerator.

When comparing transformers and pump motors (incompatible with pulsing DC) with the compatible equipment, the kick back pulses (short duration opposite polarity pulses during the off time, for 5% off time at about 100 hertz), were examined. In one set of measurements of reverse kick back voltage occurring across the output plug and without a reversed biased shunt diode to protect the switch, it was surprising discovered that the transformer and pump motor kick back pulses were no larger in absolute voltage magnitude than the voltage of the applied DC pulses made by the switch. However, the back EMF pulses from the vacuum cleaner and other high speed motors (sander, small 100 watt drill) were larger in absolute magnitude than the applied pulsed voltage. In an embodiment this difference in voltage is measured and used to sense and trigger a smart plug to turn off (or switch to AC power) when connected to a transformer or AC induction (such as a pump) motor. In this case, a kick back pulse (termed more often "back EMF" when referring to the kick back of a motor) having a sensed magnitude greater than the applied voltage (in opposite polarity) triggers the smart outlet to allow the motor to continue running.

In another embodiment the kick back pulse is detected and pulses above a threshold during the off duty cycle time or are used to trigger the smart switch (pulses that exceed the threshold trigger off or switching to AC). In another embodiment the smart switch detects AC induction motors and transformers by sensing reactance or other unique conditions that exist immediately when power is applied and before the rotor of a motor begins to move, and/or before the rotor achieves speed, such as up to 10%, 5% or 2% of operating speed. This may be determined for example, during the first 5 milliseconds, first 10 milliseconds, first 50 milliseconds, first 100 milliseconds, first 250 milliseconds and the like. During this time, a transformer and AC induction motor both behave as a transformer with a shorted secondary winding, whereas a brushed motor (which is acceptable for DC power) presents the winding resistance. A skilled artisan can use a variety of circuits and microprocessor based calculations from sensed data to make this distinction and trigger the smart outlet as described herein.

A skilled engineer can design a circuit and program a microprocessor with time based voltage and/or current measurements to detect the difference between a mostly non-inductive resistance of the brushed motor vs the inductance of a transformer with shorted secondary during this short period of time after initial powering of the appliance, before the brushed motor has had time to rotate and change electrical contacting to the rotor. In an embodiment, the kick back voltage and or current may be compared with non-inductive power consumption during this initial time period, and the switch activated (to turn off, or switch into AC) when inductive signal vs non-inductive power exceeds a threshold.

In an embodiment a passive solenoid, or other circuit breaker is used in series with the load using a blocking diode, so that only the reverse polarity kick back pulse conducts through the solenoid (or circuit breaker). Sensitivity can be adjusted to allow only strong kick back signals to activate the turn off, but in an embodiment that protects small AC transformers, a voltage sensitive circuit is used that responds to high kick back pulses of higher impedance, and lower power. This is because a large AC/DC motor such as a vacuum or electric gardening cultivator motor often produces a back EMF and works at high current. On the other hand a transformer produces a back EMF (often higher, but not always compared to some motors) but works at lower current and this differential can be used to distinguish the two electrically this way as well.

Inductance Check Via Separate Signal

In an embodiment, a pure hardware circuit made of op amps can determine whether a load is inductive, a software routine more reasonably would be designed by a skilled artisan to detect voltage lagging current (a sensed inductive load) by accepting data from one or more sensors or other electronic sensing, as a skilled artisan would readily appreciate. For example, application of a small voltage or short pulse less than 10 volts and then sensing of a rising voltage or decreasing current by two or more measurements made serially by a sensor(s) after entry of data into a file and their comparison is easily done with a microprocessor. If the plugged in device responds to an impressed voltage by current lagging the voltage over a short observation time (e.g. 0.1 sec, up to 0.5 sec etc.) then the device is inductive and the valve is turned off. Additional sensing techniques are available as is well appreciated by a skilled artisan. Preferably, the device has an alert signal such as a light or audio alarm or both, that also are turned on in response to a decision that the plugged in device is inductive. This is to alert the user that the device is rejected.

DC Pulse Power Type: Current Sensing

In an embodiment the smart receptacle provides pulsed DC power or square wave/pulsed AC power and continuously monitors for inductance by looking for differential signals across a sensing resistance during pulses. In an embodiment, DC power is supplied as square wave pulses to the smart receptacle in series with a small resister R100. Resister R100 preferably is about 0.01 ohms to about 10 ohms. The voltage across R100 is sensed to determine in an inductance is in series with the resister (i.e. an inductive load is plugged into the smart plug).

In an embodiment, R100 voltage is sensed during the on phase of a square wave power pulse supplied to the load. This is sensed during at least a period near or at the first part (from turn on) of the power pulse. If an inductance becomes connected or is added to the load, then the voltage increases (such as exponentially) during the short interval following the turn on point in time. A circuit senses the increase in voltage or waveform across R100 during the interval starting at the turn on time of the square pulse (or shortly thereafter) and compares the change in voltage to a threshold. The change in voltage may be sensed a number of ways, as a skilled artisan readily can appreciate. For example, an op amp can be connected as a differentiation amplifier to generate a differential signal change of the voltage.

In an embodiment, a purely resistive load will generate a positive down-going spike at the turn on of the square wave power and a negative spike at the turn off point of the square wave power. An inductive load will create a high and increasing (up-going) signal at the beginning of the square wave turn with a value and time duration dependent on the inductance and other reactance components of the load. In an embodiment, an initial short time at the beginning of the square wave is ignored and the increasing voltage from R100 is determined after a short delay, in order to avoid switching turn on noise.

Preferably the differentiator (hardware such as op amp or software driven microprocessor determination of voltage change) output is compared with a threshold stored value. If a positive signal, indicating an exponentially increasing voltage across R100 at or shortly after the beginning of the square wave turn on is greater than the threshold value, then the power is turned off to the smart plug output. In a preferred embodiment the sensed signals from at least 2-10 square wave cycles or preferably 5-100 cycles are averaged before making the comparison. This is particularly important when a load is first plugged in or turned on. In an embodiment the circuit senses when a load is first plugged in or turned on and waits a short period of time (such as 10 millisecond to 1000 milliseconds, preferably 20-200 milliseconds) before applying power. Upon sensing an increase in differentiated signal above the threshold, the power may be cut, with a signal to the user to unplug the appliance. Alternatively, the circuit may pause a period of time such as 10 seconds or a minute and then start over.

When using a microprocessor to carry out the comparison, preferably a stored program instructs the microprocessor to a. enter a sensed value of voltage (preferably as a voltage drop across a series connected load resistor) by going to an input location or pin and saving the sensed value at a memory location, comparing that saved value with a predetermined threshold value. If the saved value is greater than the predetermined value, then the microprocessor outputs one or more signals. The outputted signal preferably is a visual indicator (such as a red LED) to show that the load is unacceptable. In a preferred embodiment the microprocessor outputs a signal to turn off the load connection at least temporarily. This may be achieved by resetting a transistor driver to a MOSFET that is in series with a power line to the load, to turn off the MOSFET.

In a preferred embodiment the smart DC power plug continuously provides a square wave DC power and continuously (each square wave turn on) looks for an inductance (increasing voltage with time from rising square wave pulse turn on) across a low ohmic (preferably less than 0.2 ohms, more preferably less than 0.05 ohms, yet more preferably less than 0.02 ohms) resistance in series with the load. It is best to delay the first measurement at least one square wave pulse to minimize noise and to average at least 5 cycles when making the measurement for comparison. After finding the improper (inductive load above a threshold, the microprocessor or other hardware may a. decrease power such as applied voltage, duty cycle (decreasing to less than 10% or 5%), or even turn off for a set time, until the inductive load is removed or until a user resets the outlet manually.

The frequency and duty cycle of this embodiment may vary. Preferably square wave power is produced at a frequency of between 2 to 1000 hertz and more preferably between 25 and 200 hertz. Preferably the duty cycle off time is between 1% and 50% and more preferably between 5% and 50%.

Remove Harmonics from Squarewave AC or Modified AC Power

Square wave AC (and modified AC) has a portion of undesirable power in odd number harmonics. In embodiments at least some of the harmonic energy is removed either passively or actively and in a preferred embodiment the removed energy is added back (recycled). In passive removal, harmonic energy typically is absorbed by a passive filter such as a pi filter or L filter using one or more inductors and/or capacitors. In an embodiment square wave power output feeds separate high pass filters via a diode for each direction into (eg. capacitor in series, inductor in parallel to ground), which preferably remove higher harmonics for both positive and negative going AC pulses separately. Preferably a passive filter or even active filter uses diodes (passive or active MOSFET) to separate both polarities and removes higher harmonics with two separate circuits, or a bridge rectifier. In an embodiment instead of converting all of the removed high frequency power into heat by shorting out as usual, the higher frequency power is coupled into a transformer, which can both isolate the recaptured higher frequency energy and convert to a suitable voltage for other use, such as feeding back into the power input stream.

Figure 9:
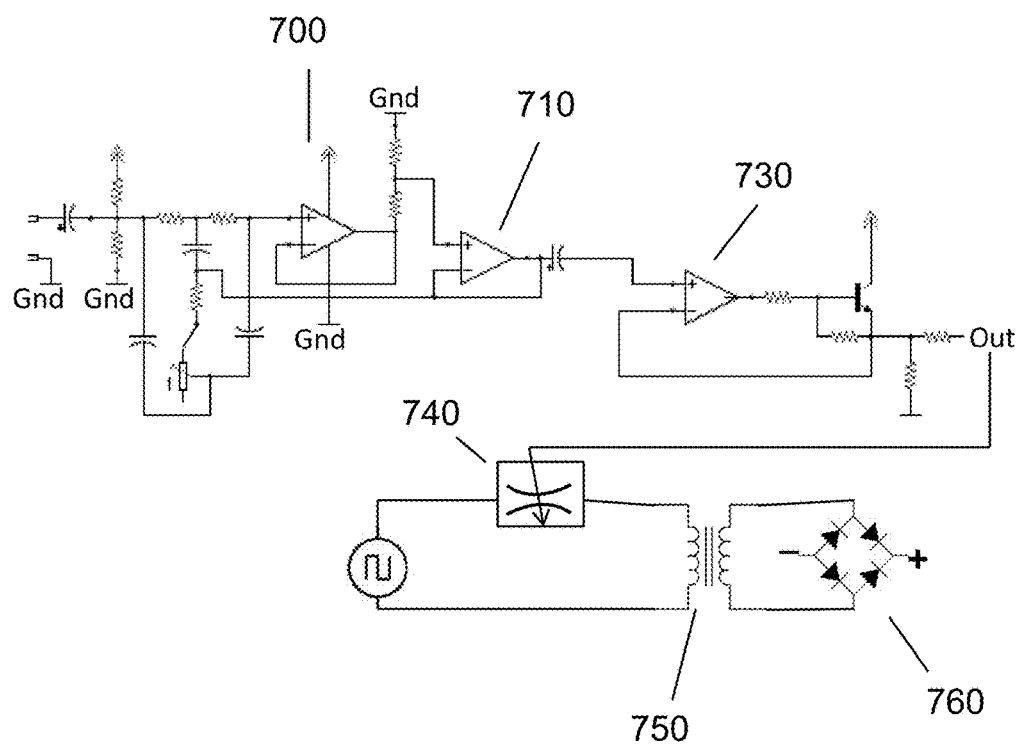
FIG. 9 is a representative outline of an active filter for square wave AC.

FIG. 9 shows a desirable embodiment of active removal. This latter embodiment preferably creates a signal corresponding to the undesired harmonics by taking a signal of the power and filtering out the fundamental 50 hertz or 60 hertz (or higher in the case of an extended off time duty cycle of an AC square wave) signal. Circuit 700 accepts a waveform input of the power and nulls out the primary frequency via a combination of resistors and capacitors. In a preferred embodiment this is done in software by an algorithm that generates the higher order harmonic signal by calculation or from a lookup table. In FIG. 9, op amp 700 and 710 form a notch filter that removes at least 90%, and preferably at least 99% of the fundamental frequency. The output is amplified by op amp 730, which drives electronic valve 740 (such as a bipolar transistor), which is connected in series with a primary winding of transformer 750. A secondary of transformer 750 outputs recovered higher frequency power, which can be rectified by rectifier 760 and reused by feeding back to the power source or for another purpose.

Many varieties of this scheme may be implemented and a microprocessor or the like such as a PIC may be programmed for the filtering, while a PWM circuit that avoids analog control can be used for greater efficiency. A microprocessor can replace some or most of the circuitry. For example the signal can be generated and processed by software that has an input for sensing the frequency of a square wave and can implement direct or indirect driving of active devices such as MOSFETs, to absorb frequencies higher than the fundamental. In a preferred embodiment PWM is used that is modulated by the signal that corresponds to the undesirable harmonics to more efficiently couple those components of the square wave power into a transformer for recycling. A skilled artisan thus can implement this active removal and preferably recycling of removed energy from harmonics of the primary square wave by a number of alternative circuits.

Example: DC to AC Inverter that can Handle Large Current Pulses

In an embodiment most (eg. more than half) of the power provided in a DC to AC inverter does not traverse an inductor and is not limited by big current spikes that otherwise would saturate the inductor core, thus limiting turn on pulses. In an example the fundamental frequency power such as 50 Hz or 60 Hz in a square wave made from DC by any known process or circuit is not subjected to an inductor such as buck inductor, boost inductor, flyback transformer or other transformer. Instead a fundamental frequency in a synthesized square wave is applied directly to the output (optionally with added harmonics in the form of a sine wave composite. The added harmonics may be generated with an inductor or without an inductor and preferably are added to the fundamental frequency.

Figure 10:
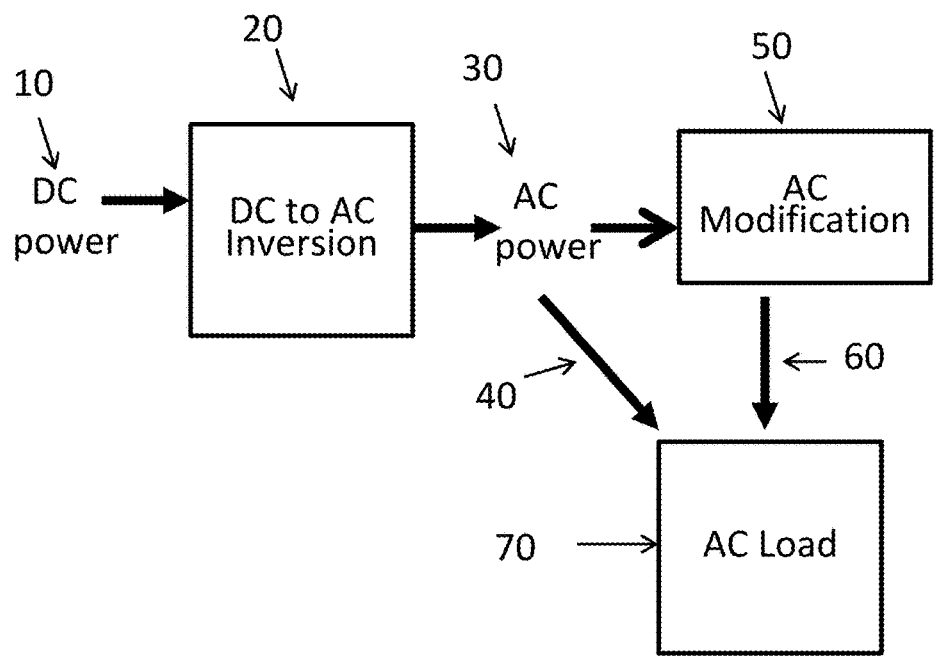
FIG. 10 shows alternative DC power handling schemes to convert DC into AC.

This example provides high current pulses such as high starting pulses to allow appliances such as AC motors and compressors to start at high instantaneous power without being limited by at least the majority of the power having to go through an inductor in DC to AC inverter. FIG. 10 outlines two alternative paths for handling a big current load pulse by avoiding passage of the majority or even all of the pulse current through an inductor or capacitor.

In a first embodiment DC input power 10 is converted to AC 30 via circuit 20. Circuit 20 preferably does not buck or boost input power 10 via capacitors or via an inductor. Accordingly, instantaneous power output from circuit 20 primarily is limited by power source 10. AC 30 in an embodiment is square wave AC. AC 30 power flows via path 40 to AC load 70. If AC load 70 is a compressor or other AC motor, upon startup, a large current supply pulse may be demanded, which is supplied by DC input power 10 without the limitation of an inductor used in buck or boost or other manipulation, from becoming saturated at high currents. Similarly, capacitance based buck or boosting is also absent, and does not limit the high starting pulse needed.

In a second embodiment DC input power 10 is converted to AC 30 as in the first embodiment, but higher harmonics (for example 150 Hz, 250 Hz, 350 Hz etc. when AC 30 is 50 Hz) are removed and added back as 50 Hz AC power via recycling into circuit 20. For example AC modulator 50 may remove these odd harmonics and convert their power into DC and then recycle that DC by feeding into circuit 20. The effect of this is to increase the voltage of the fundamental by addition of in-phase 50 Hz fundamental power obtained from the harmonics. The increased sine wave formed in circuit 50 is then supplied to load 70 via path 60. However, in an embodiment, an inductor or other current limited device is used by circuit 50 (or by coupling to circuit 20 via a transformer) and this limits pulse current that can be supplied to load 70. In this case, only the portion added (not the fundamental 50 Hz) is limited, and the fundamental is supplied at high power to the load via path 60 and/or via path 40. In an embodiment, upon sensing a high starting pulse demand from AC load 70, pathway 40 is switched on and pathway 60 is not used until the load drops.

In an embodiment the above combined circuit acts as a boost inverter by creating a fundamental AC sine wave with peak height near (ie. slightly less due to inefficiencies) or at the voltage of the DC input power along with odd harmonics. The harmonics are removed and added back in phase with the fundamental at a higher voltage. In an embodiment this is achieved by adding a transformer secondary in series with the fundamental sine wave. Preferably if the transformer becomes overloaded due to a large starting pulse needed for the load, the transformer merely shorts out, allowing the original first harmonic to supply the pulse without restriction by an inductor.

Energy Storage (Preferably Battery)

In an embodiment this device takes energy from the grid when low priority is available, as detected by at least a higher node voltage or received communication signal. In an embodiment, this device obtains energy to store locally, from same node or separate wire connected input into the device from a locally connected solar panel, wind generator or the like. In an embodiment this device only supplies backup power at its location (again, preferably via hard wire connection or plug in connection to the device itself. In another embodiment, the power storage coupler feeds backup power into the grid via attached node. This might occur in response to an emergency signal or other signal.

Each citation to art is specifically incorporated by reference in their entirety. Space limitations preclude further description of embodiments that readily will occur to a skilled artisan. For example one or more parts of each system such as that described in each figure may be omitted and the remainder used for benefit. All such embodiments especially in combinations and possible circuit permutations are intended within the ambit of the attached claims and future amended claims. The terms "pulse" and "interrupt" are used interchangeably to refer to DC power with on-time and off-time duty cycles. A skilled artisan will recognize that at very high duty cycles, the harmonic content of the power becomes very small and the harmonic frequencies become much higher, and the DC component increasingly dominates the overall RMS power.

A patent application entitled "Optimum use of solar electricity" filed by the inventor and published on Dec. 12, 2013 publication number 20130327077 on this topic and which is pending is specifically referred to and incorporated by reference in its entirety.

This application incorporates by reference U.S. Ser. No. 14/941,598 "DC Power Grid and Equipment" and specifically incorporates by reference in their entireties U.S. Provisional No. 62/080,349 filed Nov. 16, 2014 entitled "D.C. Power Grid and Equipment," and from U.S. Provisional No. 62/102,030 filed Jan. 11, 2005 entitled "D.C. Power Grid and Equipment," and from U.S. Provisional No. 62/144,320 filed Apr. 7, 2015 entitled "D.C. Power Grid and Equipment," and from U.S. Provisional No. 62/205,664 filed Aug. 15, 2015 entitled "D.C. Power Grid and Equipment" and U.S. Utility Ser. No. 14/941,598 filed Nov. 15, 2015 entitled "D.C. Power Grid and Equipment."

I claim:

1. An electric power distribution circuit that supplies interrupted direct current power to electric appliances, comprising: a. a source of the direct current power, b. a connection for an electric appliance, and c. an interrupter electrically interposed between the source of the direct current power and the connection to the electric appliance, wherein the interrupter interrupts the direct current power from the source by a randomly varying frequency of interrupt over at least a two fold range of interrupt frequencies of at least 250 hertz with an off time interrupt interval of less than 1% of the period.

2. The electric power distribution circuit of claim 1, further comprising an electrically attached computer power supply that receives the interrupted power.

3. The electric power distribution circuit of claim 1, further comprising a smart switch that deactivates supply of direct current power to the electric appliance upon detecting a back pulse during an interval between interrupts created by the interrupter.

4. The electric power distribution circuit of claim 3, further comprising an alternating circuit that converts a supply of direct current into alternating current for supply to the electric appliance in response to detecting the back pulse during the interrupt interval.

5. The electric power distribution circuit of claim 1, wherein the direct current power has a voltage of at least 100 volts, and the electric appliance has a mechanical on-off switch that is insufficient to handle the direct current power from the source of the direct current power in an absence of interruption by the interrupter due to spark formation from un-interrupted direct current power.

6. The electric power distribution circuit of claim 1, wherein the interrupter interrupts the direct current power by a randomly varying frequency of interrupt over at least a five fold range of interrupt frequencies of at least 500 hertz per second.

7. An improved alternating current circuit breaker that allows protection of a direct current circuit for the same alternating current voltage and current rating comprising an alternating current mechanical circuit breaker that interrupts a circuit upon detection of an excess current flow; the improvement comprising a direct current to pulsing direct current interrupter circuit interposed between a supply of direct current to the mechanical circuit breaker; wherein, the interrupter circuit continuously provides a constant supply of interrupted direct current from the source to the mechanical circuit breaker and wherein the interrupter circuit interrupts the direct current by a randomly varying frequency of interrupt over at least a two fold range of interrupt frequencies of at least 250 hertz with an off time of no more than 10 microseconds.

8. The improved circuit breaker of claim 7, further comprising a capacitor of at least 1 nanofarad rated for at least 1000 volts, connected in parallel to the interrupted direct current at a connected load side of the mechanical circuit breaker.

9. The circuit breaker of claim 7, wherein the direct current has a constant voltage and has fast on/off transitions of at least 100 volts per microsecond.

10. An electric power distribution circuit that supplies direct current power to electric appliances, comprising: a. a source of the direct current power, b. a connection for an electric appliance, and c. an interrupter electrically interposed between the source of the direct current power and the connection to the electric appliance, wherein the interrupter interrupts the direct current power from the source periodically with an off time interrupt interval of less than 1% of the period, and further comprising a smart switch that deactivates supply of direct current power to the electric appliance upon detecting a back pulse during an interval between interrupts created by the interrupter.

11. A smart electrical outlet that senses connection to an inductive appliance, comprising the electric power distribution circuit of claim 10.

12. The electric power distribution circuit of claim 10, further comprising a feedback circuit that responds to a decrease in supply voltage to set priority for the electric power distribution circuit.

13. The electric power distribution circuit of claim 10, wherein an off time of the pulsing direct current or pulsing alternating current is between 50% and 3% of the period of the pulsing direct current or pulsing alternating current.

14. The electric power distribution circuit of claim 10, wherein the pulsing direct current is generated by a PWM generator and at least one MOSFET or IGBT.

15. The electric power distribution circuit of claim 14, wherein the sensor and circuit comprise a PN junction forward biased diode across the two electrical connections of the electrical outlet, for reverse voltage, and a comparator wherein a comparator output turns off the MOSFET or IGBT.

16. The electric power distribution circuit of claim 10, wherein the sensor comprises a PN diode junction forward biased for reverse voltage and connected to two electrical connections of the electrical outlet.

17. The electric power distribution circuit of claim 10, which protects accidental powering an inductive appliance from direct current over at least two wires, further comprising: a power connection plug from the at least two wires for a load; the sensor of back EMF detecting induction response of the inductive appliance and a comparator that senses the inductive appliance by comparing a differential signal obtained from the two wires that indicates an inductive load of the inductive appliance; and a signaling device for alerting a user that the inductive appliance is not accepted by the electric power distribution circuit.

18. The electric power distribution circuit of claim 17, wherein before sensing the inductive appliance, the circuit supplies a smaller sensing voltage power and after determining non-inductive status of the load, increases voltage for a normal load usage power.

19. The electric power distribution circuit of claim 17, wherein the power connection plug, the sensor, the comparator, and an alert signal device are within a common enclosure.

20. The electric power distribution circuit of claim 17, wherein the sensor detects differential current in the two wires that indicates a current lag situation due to a connected inductor.

\* \* \* \* \*